United States Patent Office 3,644,471
Patented Feb. 22, 1972

3,644,471
PRODUCTION OF 2,5-DICHLOROBENZONITRILE
Eugene P. Di Bella, Rochelle Park, N.J., assignor to Tenneco Chemicals, Inc.
No Drawing. Filed Jan. 15, 1969, Ser. No. 791,485
Int. Cl. C07c 63/12, 121/52
U.S. Cl. 260—465 G                3 Claims

ABSTRACT OF THE DISCLOSURE 2,5-dichlorobenzoic acid is prepared by heating a reaction mixture comprising 1,2,4-trichlorobenzene, cuprous cyanide, and a high-boiling tertiary amine such as quinoline at about 200°–240° C. to form a cyanation product comprising 2,5-dichlorobenzonitrile and hydrolyzing the cyanation product to obtain substantially pure 2,5-dichlorobenzoic acid.

---

This invention relates to a process for the production of 2,5-dichlorobenzoic acid. More particularly, it relates to a process for the production of 2,5-dichlorobenzoic acid from 1,2,4-trichlorobenzene.

In accordance with this invention, it has been found that when 1,2,4-trichlorobenzene is reacted with cuprous cyanide in the presence of tertiary amine the product is not the mixture of 2,4-dichloro benzonitrile, 2,5-dichlorobenzonitrile, and 3,4-dichlorobenzonitrile which one might expect to obtain, but rather is substantially pure 2,5-dichlorobenzonitrile. Hydrolysis of this compound yields substantially pure 2,5-dichlorobenzoic acid. 2,5-dichlorobenzoic acid is useful as an intermediate in the manufacture of 2,5 - dichloro - 3 - nitrobenzoic acid, a widely-used selective herbicide.

In the process of this invention, 1,2,4-trichlorobenzene is cyanated by heating it with cuprous cyanide and a high-boiling tertiary amine to form a cyanation product comprising 2,5-dichlorobenzonitrile and unreacted 1,2,4-trichlorobenzene. This cyanation product is then subjected to hydrolysis to convert the 2,5-dichlorobenzonitrile in it to 2,5-dichlorobenzoic acid, which is readily separated from the reaction mixture.

The trichlorobenzene that is used as the starting material in this process may if desired contain small amounts of other trichlorobenzene isomers in addition to the 1,2,4-isomer. Cyanation and hydrolysis will convert these other trichlorobenzene isomers to the corresponding dichlorobenzoic acids. When it is desired that the product be substantially pure 2,5-dichlorobenzoic acid, the trichlorobenzene that is used as the starting material should be free of isomer other than the 1,2,4-isomer.

The cyanation is carried out by heating 1,2,4-trichlorobenzene with cuprous cyanide and a high-boiling tertiary amine at a temperature between about 200° C. and 240° C. At temperatures below 200° C. the reaction takes place too slowly to be of commercial interest. At temperatures above 240° C. the organic material may char during the cyanation and a lowered yield of the dichlorobenzoic acid may result.

The amount of cuprous cyanide that is used in the cyanation is about one mole for each mole of trichlorobenzene. If desired a slight excess of cuprous cyanide may be present. The cuprous cyanide may be added as such at the start of the reaction, or it may be formed in situ from, for example, an alkali metal cyanide and a copper salt.

The cyanation is carried out in the presence of a tertiary amine that has a boiling point above about 200° C. and preferably above 220° C. and that will react with the cuprous cyanide to form an addition product that is soluble in the reaction mixture. Among the tertiary amines that may be used in this reaction are quinoline, hydroquinoline, dimethylquinolines, isoquinoline, aminopyridines, triphenylamine, N,N-dipropylaniline, and the like. The amount of the tertiary amine that is used is about 1 mole to 5 moles per mole of cuprous cyanide used.

If desired, the cyanation may be carried out in the presence of an inorganic copper compound, such as cuprous chloride or cuprous bromide. The amount of the inorganic compound that is used is about 0.2 mole to 1 mole per mole of cuprous cyanide.

Any of the well-known hydrolysis procedures can be used to convert the 2,5-dichlorobenzonitrile to 2,5-dichlorobenzoic acid. One procedure that has given excellent results involves heating the cyanation product that contains 2,5-dichlorobenzonitrile and 1,2,4-trichlorobenzene with an aqueous solution of an alkali metal hydroxide, such as sodium hydroxide or potassium hydroxide, until hydrolysis is complete and separating the resulting organic layer which contains unreacted trichlorobenzene from the alkaline aqueous layer. Acidification of the aqueous solution causes the 2,5-dichlorobenzoic acid to precipitate. Alternatively, the dichlorobenzonitrile may be partially hydrolyzed with aqueous sulfuric acid while dissolved in a solvent, such as acetic acid, to form dichlorobenzamide which is then treated with nitrous acid to convert it to dichlorobenzoic acid.

The conversion of 1,2,4-trichlorobenzene to 2,5-dichlorobenzoic acid by the process of this invention can be carried out successfully without isolation of the intermediate products. The products of each of the steps may, however, be isolated and purified before being used in the subsequent step.

The invention is further illustrated by the example that follows.

EXAMPLE

A mixture of 91 grams (0.5 mole) of 1,2,4-trichlorobenzene, 45 grams (0.5 mole) of cuprous cyanide, and 200 grams (1.5 moles) of quinoline was heated with stirring. A thickening of the reaction mixture occurred at about 170° C.; at 205°–210° C., the cuprous cyanide dissolved. The solution was heated over a 5-hour period to 235° C. The reaction mixture was then fractionally distilled under reduced pressure. The material that boiled at 80°–190° C./3 mm. was collected; it was then treated with excess dilute hydrochloric acid to remove the quinoline. The partially-crystalline residue was dissolved in 100 ml. of petroleum ether (B.P. 65°–110° C.), and the ether solution was washed with small portions of dilute hydrochloric acid to remove traces of quinoline. Upon removal of the solvent, there was obtained 81 grams of an oily semi-solid product that was shown by gas chromatography to contain 62.0% by weight of 1,2,4-trichlorobenzene, 33.3% by weight of dichlorobenzonitrile, and 4.7% by weight of high boiling materials.

A portion of the semi-solid reaction product was recrystallized from a minimum quantity of petroleum ether (B.P. 65°–110° C.). The resulting product, which was 2,5-dichlorobenzonitrile, was a white crystalline solid that melted at 128°–129° C. (lit. 130° C.) and contained 48.9% C, 1.61% H, and 8.30% N (calculated for $C_7H_3NCl_2$, 48.8% C, 1.74% H, and 8.14% N).

A 53.5 gram portion of the semi-solid reaction product, which contained 0.183 mole of 1,2,4-trichlorobenzene and 0.104 mole of dichlorobenzonitrile, was stirred with 200 grams of 15% sodium hydroxide solution at 100°–105° C. for 52 hours. During this heating ammonia gas was evolved.

The reaction mixture was diluted with 100 ml. of water and cooled. The lower organic layer, which weighed 34.0 grams and which contained the trichlorobenzene, was separated. The alkaline aqueous layer was stirred with 1 gram of decolorizing charcoal at room temperature for 30 minutes and passed through a filter-aid bed which was then washed with 30 ml. of water. The clear filtrate and the wash water were combined and acidified with hydrochloric acid. The precipitated solid was collected by filtration, washed with cold water, and air dried at 70°–80° C. There was obtained 18.2 grams of dichlorobenzoic acid that contained 36.2% Cl and had an acid number of 299 (calculated from $C_7H_4O_2Cl_2$, 37.2% Cl and acid number of 294). Vapor phase chromatographic analysis indicated that the product contained 98.3% by weight of 2,5-dichlorobenzoic acid and 1.7% by weight of monochlorobenzoic acid.

In this process the conversion of 1,2,4-trichlorobenzene to 2,5-dichlorobenzonitrile was 31.4%; the conversion of the 2,5-dichlorobenzonitrile to 2,5-dichlorobenzoic acid was 90%. The fact that 2,5-dichlorobenzoic acid is the only dichlorobenzoic acid isomer isolated demonstrates that 1,2,4-trichlorobenzene is converted exclusively to 2,5-dichlorobenzonitrile.

The terms and expressions that have been used are used as terms of description and not of limitation. There is no intention in the use of such terms and expressions of excluding any equivalents of the features shown and described or portions thereof. It is recognized that various modifications are possible within the scope of the invention claimed.

What is claimed is:

1. The process for the production of 2,5-dichlorobenzonitrile that comprises heating at a temperature between trile that comprises heating at a temperature between 200° C. and 240° C., 1,2,4-trichlorobenzene with cuprous cyanide and a tertiary amine having a boiling point above 200° C. in the amounts of about 1 mole of cuprous cyanide and 1 mole to 5 moles of said tertiary amine per mole of 1,2,4-trichlorobenzene.

2. The process of claim 1 wherein the reaction mixture contains a tertiary amine having a boiling point above 220° C.

3. The process of claim 1 wherein the tertiary amine in the reaction mixture is quinoline.

References Cited

UNITED STATES PATENTS

| 3,144,476 | 8/1964 | Haken | 260—465 |
| 3,179,691 | 4/1965 | Koopman et al. | 260—465 |
| 3,221,048 | 11/1965 | Weil et al. | 260—515 |
| 3,489,784 | 1/1970 | Fellig et al. | 260—465 |

CHARLES B. PARKER, Primary Examiner

D. H. TORRENCE, Assistant Examiner

U.S. Cl. X.R.

260—515 A